(No Model.)
O. W. KENDALL.
PROCESS OF AND DEVICE FOR STOWING AND CURING GRAIN, HAY, &c.
No. 288,243. Patented Nov. 13, 1883.
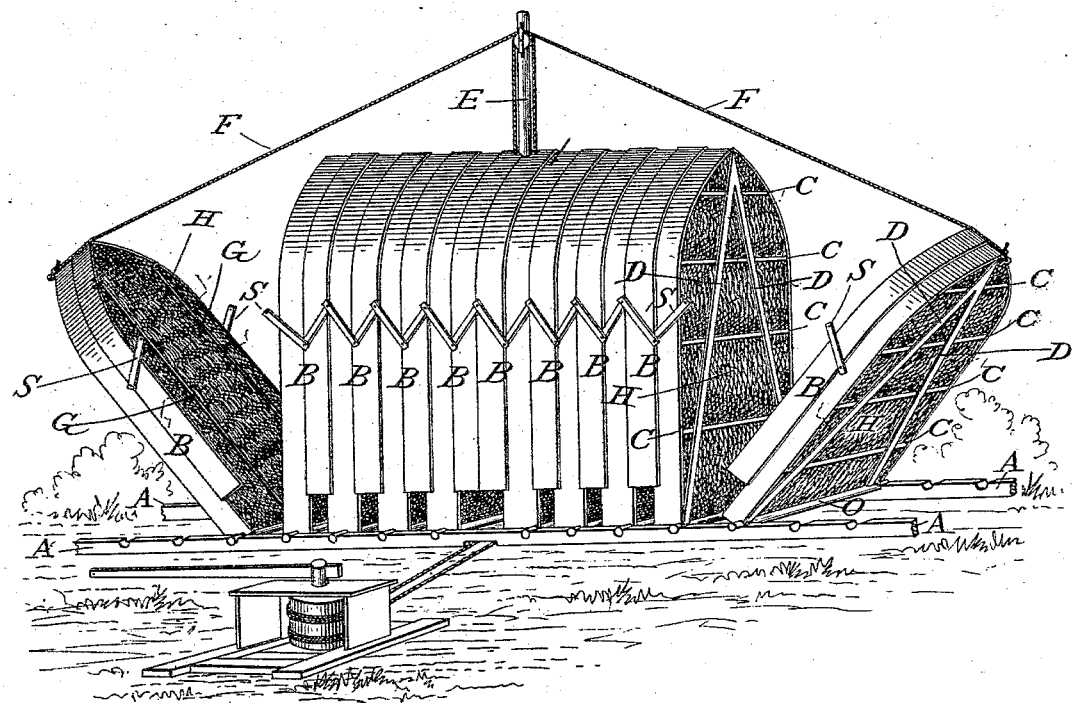
Fig. 1.
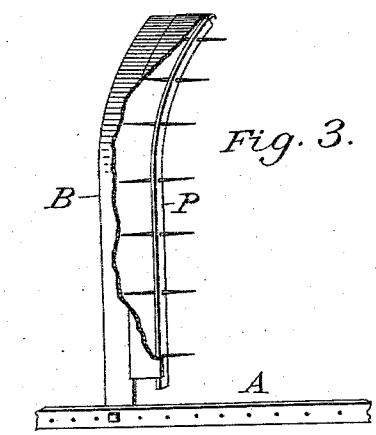
Fig. 3.
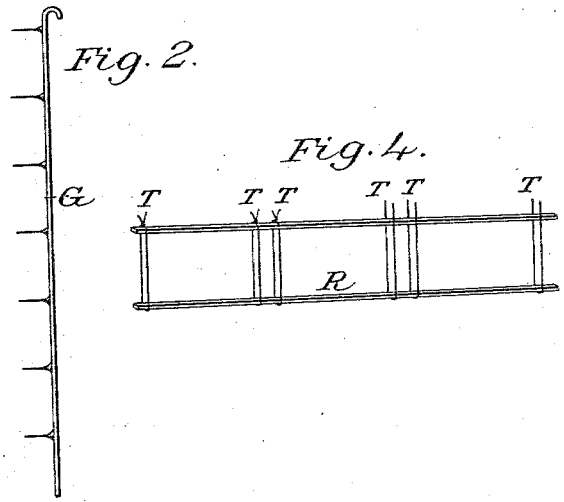
Fig. 2.
Fig. 4.
Witnesses:
Clifford M. Rathbun
George B. Dryden
Inventor:
Oscar W. Kendall

ESTADOS UNIDOS PATENT OFFICE.

OSCAR W. KENDALL, OF OLMSTED, OHIO.

PROCESS OF AND DEVICE FOR STOWING AND CURING GRAIN, HAY, &c.

SPECIFICATION forming part of Letters Patent No. 288,243, dated November 13, 1883.

Application filed March 1, 1883. (No model.)

*To all whom it may concern:*

Be it known that I, OSCAR W. KENDALL, a citizen of the United States, residing at Olmsted, in the county of Cuyahoga and State of Ohio, have invented a new and useful process of stowing and curing grain, hay, and forage crops generally, and in apparatus for carrying out said process, of which the following is a specification.

My invention relates to a process of curing said material, in which the material is stowed in vertical or approximately vertical leaves or layers and held in place in a loose open condition; and my invention furthermore relates, among other things, to lifting-frames, each of which receives the material to be cured while reclining on or near the ground, and, turning upon its base as an axis, raises it to a vertical or nearly vertical position, and, with the aid of pronged supporting-rods, holds it in place in a loose open condition until cured.

My object is, first, to provide a process by which the above-mentioned crops may be cured in mass without the disadvantages attendant upon the practice of curing in the cock or in windrows, and when cured that the material may be baled for transportation without rehandling with forks; second, to provide an inexpensive portable apparatus that may be readily set up and used in such near proximity to the material to be cured as to render unnecessary the loading of the material onto wagons until finally baled and required for transportation; third, to provide apparatus by which the material may be readily thrown open to the sun without rehandling with forks, and quickly closed within the cover again when desired, thus affording not only facilities for stowing and curing, but suitable storage for the material. The manner in which these advantages are secured is readily perceived by referring to the accompanying drawings, in which like letters refer to similar parts.

Figure 1 is a view in perspective of a stack embodying the invention. Fig. 2 is a detail view of a supporting-rod. Fig. 3 is a detail view representing a modified form of securing an axis for the sections, and also a modified form of supporting-rod to be used in cases in which the roof is to be in part of thatch; and Fig. 4 is a perspective view of baling-slats and wire bands representing my process of baling the material.

In Fig. 1 a curing-stack of ten sections is shown, eight of which are represented as secured together in an upright position. The others (one on each end) are left partly down to show the device as it appears when in operation. The sections have their base at O, and are composed of the roof B, the braces D, the cross-pieces C, the joint-braces S, and the supporting-rods G.

H represents the material to be cured, represented as being held in place by the supporting-rods, the rods being suspended from the roof at their upper ends and lightly bound down at their lower ends to hold them in place.

In the construction of the sections the parts performing similar offices are made so nearly alike as to be mutually interchangeable and readily disjointed for convenient transportation. The roof of each section is composed of two boards on a side, (the inner overlapping the outer one,) and are permanently fastened together, so as to batten the joint and assist in maintaining the curved form of the roof. The cross-pieces C are attached to the roof at their ends and to the braces D at their places of contact. The roof of the sections is readily disjoined at the ridge.

At S are shown jointed braces, the combined length of which is sufficient to allow the outer sections to lie upon the ground. They are represented in the drawings as being secured to the sections at their lower angles by bolts upon which they move, the upper joint being formed by bolting them together, but without attaching them to the roof.

It will be seen that when the sections are thrown over outwardly from the center post, E, the braces S will sustain the sections in such a manner as to admit the sun's rays to the sides of the layers of the material to be cured.

The center post, E, bears two sheaves at its top, over which the ropes F F run, and two at the bottom, under which they run in passing out to the capstan.

At A are shown the sills, provided with bearings along their upper edges for the base of the frames. A modified form is shown in Fig. 3, where the axis of the frame is formed by bolts, upon which the frames turn, the same passing through holes in the sill and through the roof of the section-frame. This form of axle is used in cases in which the frame is large, requiring considerable power in the operation. Fig. 3 also shows a modified form of supporting-rod, it being curved to conform to the contour of the roof, and is used to support the material used as thatch in cases in which the layers are too thick to be entirely covered by the roof. The thatch is formed while the frame is yet in a reclining position by pressing sheaves of any suitable material down onto the prongs of the rods, laying them so as to overlap each other shingle fashion.

In operating the device I begin to set up the frames at the center post, working each way at the same time, and, if the capstan is used, raising one or more on each side at a time, thus equalizing the strain upon each side of the post. If the material is to be baled when dry, a suitable number of baling-slats are put onto the frame before the material is put on. The material is then spread onto the frames in suitable layers, (not so much at any one time as to lead to injury from overheating,) when the supporting-rods are put on and properly secured, and the frames are set up. As the material becomes dry enough to be safe to do so, the frames are lowered for the addition of fresh material until they are full enough, when the supporting-rods are removed and other baling-slats placed on the material opposite those at first put on. The wire bands, bent for the purpose, (hair-pin fashion,) are then passed down through the layer in such a way as to clasp the slats, (each to its opposite,) as shown in Fig. 4, where R represents the slats, and T the wire bands. Power is now applied, the frames raised, and the material compressed, when the bands will be forced through the layer to their utmost extent, when they may be twisted together, as shown in the figure. The slats are then sawed in proper lengths and the layer cut up with a hay-knife into suitable bales.

It is believed that no attempt has been made heretofore to cure forage crops—such as clover and the grasses generally—mainly in mass, after they had been stowed in stacks and mows. Many ways have been tried in damp climates to keep the heat within safe limits, such as forming open spaces in the centers to act as chimneys to create a draft, the action of such draft being salutary; but its effect could only reach the material near the spaces and was partial in its operation. The failure to secure sufficient ventilation is due to the compacting of the material, made necessary in building stacks, by commencing at the bottom and laying successive horizontal layers, as has heretofore been the practice.

What I claim as my invention, and desire to secure by Letters Patent, is—

1. A process of stowing and curing grain, hay, and forage crops generally, the same consisting, essentially, in placing the material to be cured in two or more horizontal or approximately horizontal layers, and then raising and maintaining said layers in a vertical or approximately vertical position, so as to secure said material from settling or otherwise compacting, substantially as set forth.

2. A process of stowing and curing grain, hay, and forage crops generally, the same consisting in stowing the material to be cured in vertical or approximately vertical layers, and subsequently placing layers of fresh material between consecutive layers of the cured material, thereby causing the moisture of the fresh material to be in part absorbed by the cured material, and thus equalizing the moisture of the entire mass, so that the temperature may be maintained below the danger-point, substantially as set forth.

3. A process of stowing and curing grain, hay, and forage crops generally, the same consisting in maintaining the material to be cured in independent vertical or approximately vertical layers, separating them (the said layers) as desired by swinging them over toward the ground, so as to expose their sides to the direct action of the sun's rays, and at will closing said layers, substantially as set forth and described.

4. An apparatus for stowing and curing grain, hay, and forage crops generally, the same consisting, essentially, of two or more frames constructed to turn upon their respective bases as axes, whereby said frames may be placed in horizontal or approximately horizontal position to receive the material to be cured, and may then be swung up into vertical or vertically-inclined position, as desired, substantially as set forth.

5. An apparatus for stowing and curing grain, hay, and forage crops generally, the same consisting of two or more frames respectively axled at their bases, so that they may be maintained at a horizontal, vertical, or any intermediate angle of position, said frames being severally provided with roofing, substantially as set forth.

6. In apparatus for stowing and curing grain, hay, and forage crops generally, a series of frames, respectively axled at their bases and constructed to be placed face to face, the frames being severally provided with independent roofing-sections, adapted, when the frames are closed together, to form a continuous roof over the entire series, substantially as set forth.

7. In apparatus for stowing and curing grain, hay, and forage crops generally, a series of frames, severally axled at their bases and provided with independent roofing-sections, said sections being curved or arched and adapted to fit one over the other, so as to batten the joints, substantially as set forth.

8. In apparatus for stowing and curing grain, hay, and forage crops generally, the combination, with a frame axled at its base, of one or more supporting-rods adapted to be secured to said frame, and thereby to bind the material, substantially as set forth.

9. In apparatus for the stowing and curing of grain, hay, and forage crops generally, the combination, with a frame axled at its base, of one or more pairs of baling-slats, each pair inclosing the layer of material to be baled, and to be bound together by suitable means, substantially as set forth.

OSCAR W. KENDALL.

Witnesses:
CLIFFORD M. RATHBUN,
GEORGE B. DRYDEN.